(12) United States Patent
Dire et al.

(10) Patent No.: US 12,195,597 B2
(45) Date of Patent: Jan. 14, 2025

(54) RUBBER COMPOSITION BASED ON A MODIFIED DIENE ELASTOMER

(71) Applicant: COMPAGNIE GENERALE DES ETABLISSEMENTS MICHELIN, Clermont-Ferrand (FR)

(72) Inventors: Charlotte Dire, Clermont-Ferrand (FR); Benoît De-Gaudemaris, Clermont-Ferrand (FR); Julien Chatard, Clermont-Ferrand (FR); Kevin Roos, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 766 days.

(21) Appl. No.: 17/291,901

(22) PCT Filed: Nov. 7, 2019

(86) PCT No.: PCT/FR2019/052643
§ 371 (c)(1),
(2) Date: May 6, 2021

(87) PCT Pub. No.: WO2020/094990
PCT Pub. Date: May 14, 2020

(65) Prior Publication Data
US 2022/0127422 A1    Apr. 28, 2022

(30) Foreign Application Priority Data
Nov. 8, 2018  (FR) ........................ 1860307

(51) Int. Cl.
| | |
|---|---|
| *B60C 1/00* | (2006.01) |
| *C08G 65/08* | (2006.01) |
| *C08G 65/333* | (2006.01) |
| *C08G 65/336* | (2006.01) |
| *C08G 81/02* | (2006.01) |
| *C08K 3/36* | (2006.01) |
| *C08K 5/01* | (2006.01) |
| *C08L 9/06* | (2006.01) |

(52) U.S. Cl.
CPC .......... *C08G 81/025* (2013.01); *B60C 1/0016* (2013.01); *B60C 1/0025* (2013.01); *C08G 65/08* (2013.01); *C08G 65/33303* (2013.01); *C08G 65/336* (2013.01); *C08K 3/36* (2013.01); *C08K 5/01* (2013.01); *C08L 9/06* (2013.01); *C08L 2205/02* (2013.01); *C08L 2205/03* (2013.01)

(58) Field of Classification Search
CPC .... C08G 81/025; C08G 65/336; C08G 65/08; C08G 65/33303; C08K 3/36; C08K 5/01; C08L 9/06
USPC ........................................................ 523/156
See application file for complete search history.

(56) References Cited

U.S. PATENT DOCUMENTS

| | | | |
|---|---|---|---|
| 2010/0249270 A1 | 9/2010 | Robert et al. | |
| 2016/0237219 A1 | 8/2016 | Dire et al. | |

FOREIGN PATENT DOCUMENTS

| | | |
|---|---|---|
| WO | 2009000750 A1 | 12/2008 |
| WO | 2015044225 A1 | 4/2015 |

OTHER PUBLICATIONS

International Search Report with translation and Written Opinion corresponding to PCT/FR2019/052643 dated Feb. 11, 2020.

*Primary Examiner* — Ruiyun Zhang
(74) *Attorney, Agent, or Firm* — Dickinson Wright PLLC

(57) ABSTRACT

A rubber composition based at least on a reinforcing filler comprising a content of silica of greater than or equal to 80 phr and on an elastomer matrix comprising a content of a modified diene elastomer of greater than or equal to 75 phr is provided. The modified diene elastomer includes macromolecules comprising, within their structure, a linear or branched polyether block comprising, at each of the two ends of the block, a branch point to which up to three diene elastomer branches and up to three —OR groups are bonded, R representing, independently of one another, a $C_1$-$C_8$ alkyl substituent or a hydrogen atom b—the. The copolymer is composed:

of at least 20% of branched macromolecules comprising a polyether block to which at least three diene elastomer blocks are bonded, of at most 80% of linear macromolecules, and d—each of the branch points includes a silicon atom.

19 Claims, No Drawings

RUBBER COMPOSITION BASED ON A MODIFIED DIENE ELASTOMER

This application is a 371 national phase entry of PCT/FR2019/052643 filed on 7 Nov. 2019, which claims benefit of French Patent Application No. 1860307, filed 8 Nov. 2018, the entire contents of which are incorporated herein by reference for all purposes.

BACKGROUND

1. Technical Field

The invention relates to a rubber composition comprising a modified diene elastomer and silica as reinforcing filler.

2. Prior Art

Now that savings in fuel and the need to protect the environment have become a priority, it is desirable to produce mixtures having a hysteresis which is as low as possible in order to be able to process them in the form of rubber compositions which can be used in the manufacture of various semi-finished products participating in the composition of tires, such as, for example, underlayers, sidewalls or treads, and in order to obtain tires having a reduced rolling resistance.

Ideally, for example, a tire tread must fulfil a great many technical requirements, which are often contradictory in nature, including a high wear resistance while affording the tire a low rolling resistance.

Moreover, the reduction in the hysteresis of the mixtures, evidence of a reduction in the rolling resistance, must also be achieved while keeping intact the suitability for processing, in particular in the raw state, of the mixtures, while maintaining the creep strength of the elastomers.

Many solutions have already been experimented with in order to achieve the objective of a fall in hysteresis. Mention may in particular be made of the modification of the structure of diene polymers and copolymers at the end of polymerization by means of functionalizing agents, coupling agents or star-branching agents with the aim of obtaining a good interaction between the polymer, thus modified, and the filler, whether carbon black or a reinforcing inorganic filler.

Within the context of mixtures containing a reinforcing inorganic filler, such as silica, provision has been made to use diene polymers functionalized by alkoxysilane derivatives, in particular by combining or not combining the functionalization by alkoxysilane functions with the functionalization by other functions, in particular amine, imine, epoxy or also thiol functions.

Functionalization by alkoxysilane compounds bearing an amino function has been widely described in the patent literature. Elastomers functionalized at the chain end by alkoxysilane functions bearing an amino group have been combined equally well with silica and with carbon black, indeed even a mixture of these two fillers, in rubber compositions intended for the manufacture of tires.

The Applicant Company has for its part described, in the document WO 2009133068 A1, a functionalized diene elastomer essentially composed of the coupled entity of an elastomer having, within the chain, a group bearing an alkoxysilane function and an amine function, the silicon atom of this group bonding the two parts of the diene elastomer chain. This elastomer functionalized in the middle of the chain confers improved mechanical and dynamic properties on the composition in which it is present, in particular an improved hysteresis, while retaining a satisfactory raw processing, for the purpose in particular of use as tire tread.

The documents EP 2 003 146 A2 and US 2014/0243476A1 describe diene elastomers modified with functionalizing agents having both at least one silicon atom and at least one nitrogen atom. JP 2016017097A describes diene elastomers modified with functionalizing agents having both at least one silicon atom and at least one nitrogen atom, bearing an amino functional group at the end of the chains which is not bonded to the functionalizing agent. These documents provide for improving the mechanical and dynamic properties of rubber compositions having low contents of reinforcing filler and intended for a tire application, and in particular highlight gains in wet grip, an improvement in heat dissipation, gains in rolling resistance or in abrasion resistance.

For the purpose of achieving certain performance qualities of the tire, it may prove to be necessary to use more or less reinforcing filler in the rubber compositions which make up the different parts of the tire. In point of fact, the use of a large amount of filler to achieve some of these performance qualities conflicts, however, with the desired fall in the rolling resistance. This is because the use of a high content of reinforcing filler in the mixture used to manufacture the tread is frequently disadvantageous, if appropriate often in a prohibitive manner, to the rolling resistance properties, being accompanied by a significant increase in hysteresis losses of the rubber composition.

The technical problem which the present invention proposes to solve is that of weakening the effect of the increase in the content of reinforcing filler on the dynamic properties of the rubber compositions and their processing with a view to use of these compositions in the manufacture of tires having a reduced rolling resistance.

SUMMARY

On continuing its research studies, the Applicant Company has discovered that the use of certain specific modified diene elastomers in rubber compositions makes it possible to reduce the impact of the increase in the content of reinforcing fillers on the processing/hysteresis compromise. It is thus possible to provide tire rubber compositions comprising a high content of reinforcing fillers while minimizing the effect of this high content on the hysteresis and processing properties of the compositions.

A subject-matter of the invention is thus a rubber composition based at least on a reinforcing filler and on an elastomer matrix comprising a modified diene elastomer, characterized in that:

the content of reinforcing filler is greater than or equal to 80 phr, the content of modified diene elastomer is greater than or equal to 75 phr, and the modified diene elastomer comprises macromolecules comprising a linear or branched polyether block comprising, at each end of the block, a branch point to which up to three diene elastomer blocks and up to three —OR groups are bonded, R representing, independently of one another, a $C_1$-$C_8$ alkyl substituent or a hydrogen atom, a—the copolymer exhibiting a Mooney viscosity of at least 10 and of at most 100,
b—the copolymer being composed:
of at least 20%, preferably 30%, of branched macromolecules comprising the polyether block to which at least three diene elastomer blocks are bonded,
of at most 80%, preferably 70%, of linear macromolecules,
c—the polyether block exhibiting a number-average molar mass ranging from 150 g/mol to 5000 g/mol, and
d—each of the branch points consisting of a silicon atom.

DETAILED DESCRIPTION

In the present description, unless expressly indicated otherwise, all the percentages (%) shown are % by weight. Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also denoted.

The expression composition "based on" should be understood as meaning a composition comprising the mixture and/or the reaction product of the various constituents used, some of these base constituents being capable of reacting, or intended to react, with one another, at least in part, during the various phases of manufacture of the composition, in particular during its crosslinking or vulcanization.

In the present description, the abbreviation "phr" means parts by weight per hundred parts by weight of elastomers present in the elastomer matrix, the elastomer matrix denoting all of the elastomers present in the rubber composition.

In the present patent application, "predominantly" or "predominant", in connection with a compound, is understood to mean that this compound is predominant among the compounds of the same type in the composition, that is to say that it is that which represents the biggest fraction by weight among the compounds of the same type. In the same way, a "predominant" functional entity of a modified diene elastomer is that representing the biggest fraction by weight among the functionalized entities constituting the diene elastomer, with respect to the total weight of the modified diene elastomer. In a system comprising just one compound of a certain type, the latter is predominant within the meaning of the present invention.

In the present description, Mooney viscosity is understood to mean the ML(1+4100°) C Mooney viscosity of a compound, in particular of the modified diene elastomer of the invention, measured according to Standard ASTM D1646.

In the present description, "functional polyether" is understood to mean a difunctional polyether. The functional polyether can be linear or branched and exhibits a main chain comprising, at each of the two ends, a silicon atom, each substituted by three alkoxyl functions or by three halogen atoms. A linear polyether comprises, at the two ends of the polymer chain, a silicon atom, each substituted by three alkoxyl functions or by three halogen atoms. A branched polyether comprises a linear main chain, all or a part of the repeat units of which are branched. A branched polyether comprises, at each of the two ends of the main chain, a silicon atom, each substituted by three alkoxyl functions or by three halogen atoms. The branches are hydrocarbon, preferably aliphatic, branches and do not comprise a silicon atom.

In the present description, modified diene elastomer is understood to mean a mixture of macromolecules resulting from the reaction with a functional polyether comprising six reactive trialkoxysilyl or trihalosilyl functions.

A person skilled in the art will understand that a modification reaction with a compound comprising more than one function reactive with respect to the living elastomer results in a mixture of linear macromolecules and of branched macromolecules having at least three branches and at most as many branches as reactive functions of the functional polyether. Depending on the operating conditions, mainly the molar ratio of the number of reactive functions of the functional polyether to the living chains, certain macromolecules are present to a greater or lesser extent in the mixture.

In the present description, the expression "monomer unit", whether it is diene or other, is understood as a repeat unit of the polymer resulting from the monomer in question.

It should be noted that, in the context of the invention, the monomers used can be of fossil or biosourced origin. In the latter case, they may partially or completely result from biomass or be obtained from renewable starting materials resulting from biomass.

Thus, the invention relates to a rubber composition based at least on a reinforcing filler comprising silica and on an elastomer matrix comprising a modified diene elastomer, characterized in that:
the content of silica is greater than or equal to 80 phr,
the content of modified diene elastomer is greater than or equal to 75 phr, and
the modified diene elastomer comprises macromolecules comprising, within their structure, a linear or branched polyether block comprising, at the two ends of the block, a branch point to which up to three diene elastomer blocks and up to three —OR groups are bonded, R representing, independently of one another, a $C_1$-$C_8$ alkyl substituent or a hydrogen atom,
a—the copolymer exhibiting a Mooney viscosity of at least 10 and of at most 100,
b—the copolymer being composed:
of at least 20%, preferably at least 30%, of branched macromolecules comprising a polyether block to which at least three diene elastomer blocks are bonded,
of at most 80%, preferably at most 70%, of linear macromolecules,
c—the polyether block exhibiting a number-average molecular weight varying from 150 to 5000 g/mol, and
d—each of the branch points consisting of a silicon atom.

Diene elastomer capable of being used as the modified diene elastomer in the compositions in accordance with the invention should be understood in a known way as meaning a synthetic elastomer constituted at least in part by conjugated or non-conjugated diene monomer units.

Synthetic diene elastomer is understood more particularly to mean:
(a)—any homopolymer of a diene monomer, particularly a conjugated diene monomer, in particular any homopolymer obtained by polymerization of a conjugated diene monomer having from 4 to 12 carbon atoms;

(b)—any copolymer obtained by copolymerization of one or more diene monomers with one another or with one or more vinylaromatic monomers.

In the case of copolymers (b), the latter contain from 20% to 99% by weight of diene units and from 1% to 80% by weight of units resulting from vinylaromatic monomers.

The following are suitable in particular as conjugated dienes: 1,3-butadiene, 2-methyl-1,3-butadiene (isoprene), 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Preferably, the conjugated diene is a derivative of 1,3-butadiene, more preferably 1,3-butadiene.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene. Preferably, the vinylaromatic compound is styrene.

Preferentially, the diene elastomer is selected from the group consisting of polybutadienes (BRs), synthetic polyisoprenes (IRs), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs). According to an alternative form of the invention, the diene elastomer is more particularly a butadiene/styrene copolymer (SBR) or a polybutadiene (BR).

The diene elastomer can have any microstructure which depends on the polymerization conditions used.

The diene elastomer can be a block, random, sequential, microsequential, and the like, elastomer.

According to an alternative form of the invention, the number-average molar mass of the elastomer branches of the modified diene elastomer is less than 150 000 g/mol, preferentially at least 40 000 g/mol and at most 100 000 g/mol.

According to an alternative form of the invention, the end of the elastomer branches of the block copolymer, which end is not bonded to a silicon atom, can bear a function comprising a nitrogen atom, preferably a cyclic or acyclic amine function. Preferably, the ends of elastomer branches of the block copolymer are functionalized to at least 70 mol %, with respect to the number of moles of elastomer branches, by a cyclic or acyclic amine function.

The alkoxy groups substituting the silicon atom can, according to some alternative forms of the invention, be partially or completely hydrolysed to give hydroxyl groups. According to these alternative forms, all or at least 50 mol % of the alkoxy groups borne by the modified diene elastomer are hydrolysed to give hydroxyl groups. In particular, at least 80 mol % of the alkoxy functions borne by the modified diene elastomer are hydrolysed to give hydroxyl groups, indeed even 100%.

The alkyl substituents of the alkoxy groups substituting the silicon atoms are, independently of one another, chosen from $C_1$-$C_{10}$, indeed even $C_1$-$C_8$, alkyl substituents, preferably from $C_1$-$C_4$ alkyl substituents, more preferentially from methyl and ethyl.

According to an alternative form of the invention, the polyether block is a block consisting of —(O—R)— units, in which R is a linear or branched divalent hydrocarbon group, preferably an aliphatic group, having 1 to 10 carbon atoms, in particular a —CH(R')—CH(R")— group, in which R' and R" are, independently of each other, a hydrogen atom or a $C_1$-$C_4$ alkyl substituent; preferably, R is a $C_1$-$C_4$ alkanediyl group, more preferentially a 1,2-ethanediyl or a 1,2- or 1,3-propanediyl group.

Mention may thus be made, as polyether block suitable for the invention, of polyoxymethylene, poly(ethylene oxide), poly(propylene oxide) or polytetrahydrofuran; preferably, the polyether block is a poly(ethylene oxide) or poly(propylene oxide) block.

According to an alternative form of the invention, the polyether block exhibits a number-average molecular weight substantially of 150 to 5000 g/mol and preferentially of 200 to 3000 g/mol. The number-average molecular weight is calculated by the SEC (Size Exclusion Chromatography) technique, which makes it possible to separate macromolecules in solution according to their size through columns filled with a porous gel. The method is explained later in the text.

According to the invention, the branch points of the block copolymer to which the diene elastomer chains are bonded are silicon atoms. There are two branch points which are located at each end of the linear polyether block.

Thus, a branch point can bond up to three diene elastomer blocks to the polyether block.

According to the invention, the linear macromolecules consist of elastomer chains not bonded to a polyether block, of macromolecules, each branch point of which is bonded to a diene elastomer block (linear triblock copolymer), and of macromolecules, just one branch point of which is bonded to a diene elastomer block (linear diblock copolymer). Their content by weight is at most 80%, preferably at most 70% and more preferentially still at most 65%, with respect to the total weight of the block copolymer.

According to the invention, the branched macromolecules consist of macromolecules, all of the branch points of which are bonded to at most three diene elastomer blocks. For reasons of technical reality and feasibility, these macromolecules preferably exhibit a distribution of the diene elastomer blocks on either side of the polyether block, on the branching points, that is to say that not all the elastomer blocks are bonded to the same branch point but are distributed over the two branch points. Thus, when the polyether block is linear, the three-branched macromolecules can comprise two elastomer branches at one end of the polyether block and one elastomer branch at the other end, the four-branched macromolecules can comprise two elastomer branches at one end of the polyether block and two elastomer branches at the other end or three elastomer branches at one end of the polyether block and one elastomer branch at the other end, and so on. The content by weight of the branched macromolecules is at least 20%, preferably at least 30% and preferably again at least 35%, with respect to the total weight of the block copolymer.

When the branch points, which are silicon atoms, are not bonded to three diene elastomer blocks, they are substituted by one, two or three hydroxyl or $C_1$-$C_{18}$ alkoxy, $C_5$-$C_{18}$ cycloalkoxy or $C_6$-$C_{18}$ aryloxy substituents. Preferably, when the silicon atoms bear one or more alkoxy substituents, the latter are $C_1$-$C_8$, preferentially $C_1$-$C_4$, alkoxy substituents, preferably again methoxy or ethoxy.

The alkoxy groups substituting the silicon atom can, according to some alternative forms of the invention, be partially or completely hydrolysed to give hydroxyl groups. According to these alternative forms, all or at least 50 mol % of the alkoxy functions borne by the modified diene elastomer are hydrolysed to give hydroxyl groups. In particular, at least 80 mol % of the alkoxy functions borne by the modified diene elastomer are hydrolysed to give hydroxyl groups, indeed even 100%.

The block macromolecules making up the diene block copolymer according to this alternative form of the invention can be represented by the following formulae I and II: the branched macromolecules corresponding to the formula I:

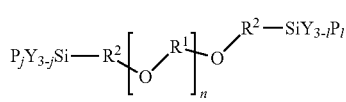

Formula I in which:
- $R^1$ represents a linear or branched divalent hydrocarbon group, preferably aliphatic group, having 1 to 10 carbon atoms, in particular a —CH(R')—CH(R")— group, in which R' and R" are, independently of each other, a hydrogen atom or a $C_1$-$C_4$ alkyl substituent; preferably, $R^1$ is a $C_1$-$C_4$ alkanediyl group, more preferentially a 1,2- or 1,3-ethanediyl or -propanediyl group,
- the $R^2$ groups represent, independently of each other, a saturated or unsaturated, linear or branched or cyclic, divalent hydrocarbon group, preferably aliphatic group, having 1 to 50 carbon atoms, preferably a linear aliphatic group, which is preferably saturated, preferentially having 1 to 15 carbon atoms, preferably 2 to 10,
- the Y groups represent, identically or differently, a group of formula —$OR^4$ in which the $R^4$ groups represent, independently of one another, a hydrogen atom or a $C_1$-$C_{18}$ alkyl, $C_5$-$C_{18}$ cycloalkyl or $C_6$-$C_{18}$ aryl substituent; preferably, the $R^4$ groups represent a hydrogen atom or a $C_1$-$C_8$, more preferentially $C_1$-$C_4$, alkyl substituent, preferably again methyl or ethyl,
- i and j are numbers having, each independently of the other, the value 1, 2 or 3, with the proviso that (i+j) varies from 3 to 6, and
- P represents a diene elastomer block;

the linear block macromolecules corresponding to the formula II:

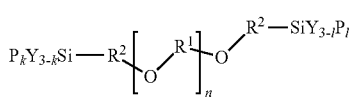

Formula II in which:
- $R^1$ represents a saturated or unsaturated, linear or branched, divalent hydrocarbon group, preferably aliphatic group, having 1 to 10 carbon atoms, in particular a —CH(R')—CH(R")— group, in which R' and R" are, independently of each other, a hydrogen atom or a $C_1$-$C_4$ alkyl substituent; preferably, $R^1$ is a $C_1$-$C_4$ alkanediyl group, more preferentially a 1,2- or 1,3-ethanediyl or -propanediyl group,
- the $R^2$ groups represent, independently of each other, a saturated or unsaturated, linear or branched or cyclic, divalent hydrocarbon group, preferably aliphatic group, having 1 to 50 carbon atoms, preferably a linear aliphatic group, which is preferably saturated, preferentially having 1 to 15 carbon atoms, preferably 2 to 10,
- the Y groups represent, identically or differently, a group of formula —$OR^4$ in which the $R^4$ groups represent, independently of one another, a hydrogen atom or a $C_1$-$C_{18}$ alkyl, $C_5$-Cis cycloalkyl or $C_6$-$C_{18}$ aryl substituent; preferably, the $R^4$ groups represent a hydrogen atom or a $C_1$-$C_8$, preferentially $C_1$-$C_4$, alkyl substituent, preferably again methyl or ethyl,
- k and l are numbers having, each independently of the other, the value 0 or 1, with the proviso that (k+1) has the value 1 or 2, and
- P represents a diene elastomer block.

According to alternative forms of the invention which can be combined with the preceding ones, P represents a diene elastomer branch bearing at the chain end a group comprising a nitrogen atom, more particularly a cyclic or acyclic amine function.

The modified diene elastomer according to a preferred alternative embodiment of the invention comprises at least 50% by weight of branched macromolecules with respect to the total weight of the modified diene elastomer, preferably at least 80% by weight, the branched macromolecules being all of the macromolecules having at least three branches of the modified diene elastomer, that is to say that they consist of a polyether block to which at least three diene elastomer blocks are bonded.

The reader will understand that, when the macromolecules of the modified diene elastomer correspond to the formulae I and II, according to this alternative form, at least 50% by weight of branched macromolecules with respect to the total weight of the modified diene elastomer, preferably at least 80% by weight, correspond to the formula I.

According to another alternative form, which can be combined with the preceding one, at most 25% by weight of the total weight of the modified diene elastomer can consist of macromolecules comprising a polyether block to which four or more diene elastomer blocks are bonded.

The reader will understand that, when the macromolecules of the modified diene elastomer correspond to the formulae I and II, according to this alternative form, at most 25% by weight of branched macromolecules with respect to the total weight of the modified diene elastomer correspond to the formula I for which i+j has the value 4 or more.

The modified diene elastomer according to another preferred alternative embodiment of the invention, which can be combined with one or other of the two preceding alternative forms or with the combination of the two, comprises at least 20%, preferably at least 35%, by weight of branched macromolecules having three branches, with respect to the total weight of the modified diene elastomer, preferably at least 40%, the macromolecules having three branches consisting of a polyether block to which three diene elastomer blocks are bonded.

The reader will understand that, when the macromolecules of the modified diene elastomer correspond to the formulae I and II, according to this alternative form, at least 20%, preferably at least 35%, by weight of branched macromolecules with respect to the total weight of the modified diene elastomer, preferably at least 40% by weight, correspond to the formula I for which i+j has the value 3.

The various preferential alternative forms and aspects concerning the nature of the modified diene elastomer, the functionalization of the elastomer branches, their Mn, the alkoxy function, the number of silicon atoms, the spacer group and the group comprising at least one nitrogen atom, the content of branched macromolecules, the content of three-branched macromolecules, and the like, can be combined with one another, subject to their compatibility.

According to advantageous alternative forms of the invention, the modified diene elastomer comprising macromolecules comprising, within their structure, a linear or branched polyether block comprising, at each chain end, a branch point to which up to three diene elastomer blocks and up to three —OR groups are bonded, R representing, independently of one another, a $C_1$-$C_8$ alkyl substituent or a hydrogen atom, is such that at least one, at least two, at least three, at least four, at least five, at least six, at least seven and preferably all of the following characteristics is/are observed:

the polyether block consists of —(OR)— units, in which R is a $C_1$-$C_4$ alkanediyl group, more preferentially a 1,2- or 1,3-ethanediyl or -propanediyl group, the polyether block exhibits a number-average molecular weight substantially of 150 to 5000 g/mol and preferentially of 200 to 3000 g/mol;

all or a part, preferably at least 50 mol %, of the alkoxy functions substituting one or more silicon atoms are hydrolysed to give hydroxyl groups;

the diene elastomer is a butadiene/styrene copolymer;

all or a part, preferably at least 70 mol %, of the ends of elastomer branches not bonded to a silicon atom are functionalized, with respect to the number of moles of chain end, by an amine function;

the mean Mn of the elastomer branches is less than 150 000 g/mol, preferably from 40 000 to 100 000 g/mol;

the modified diene elastomer comprises at least 50% by weight of branched macromolecules having at least three branches;

the modified diene elastomer comprises at least 20% by weight, preferably at least 35%, of branched macromolecules having three branches.

According to these advantageous alternative forms of the invention, the modified diene elastomer can comprise, according to a preferential aspect, at most 25% by weight of branched macromolecules having four and more branches.

The modified diene elastomer according to the invention can be obtained according to a synthesis process comprising the reaction of a living diene elastomer, resulting from the polymerization of at least one diene monomer, with a linear or branched functional polyether with a number-average molecular weight varying from 150 to 5000 g/mol comprising, at each chain end, a silicon-based trifunctional group, reactive with respect to the reactive end of the living elastomer, chosen from trialkoxysilyls or trihalosilyls.

Another subject-matter of the invention is a rubber composition based at least on a reinforcing filler comprising a content of silica of greater than or equal to 80 phr, preferably of greater than or equal to 100 phr, and on an elastomer matrix comprising a content of a modified diene elastomer of greater than or equal to 75 phr, the modified diene elastomer being obtained by this synthesis process, including its specific, advantageous and preferential aspects described below.

The polymerization stage according to the invention can be carried out by anionic polymerization initiated, for example, by means of an organic compound of an alkali metal or alkaline earth metal. The polymerization of at least one conjugated diene monomer according to these different implementations generates elastomer chains having a reactive site at the chain end. The term then commonly used is living elastomer or living chain.

In the context of an anionic polymerization, the polymerization initiator can be any known anionic initiator. An initiator containing an alkali metal, such as lithium, is preferably used.

Suitable organolithium initiators are in particular those comprising at least one carbon-lithium bond or at least one nitrogen-lithium bond. Representative compounds are aliphatic organolithium compounds, such as ethyllithium, n-butyllithium (n-BuLi) or isobutyllithium, and lithium amides obtained from a cyclic secondary amine, such as pyrrolidine and hexamethyleneimine. Such anionic polymerization initiators are known to a person skilled in the art.

The polymerization can be carried out in a way known per se. The polymerization is generally carried out at temperatures of between 0° C. and 110° C. and preferably from 40° C. to 100° C., indeed even from 50° C. to 90° C. The polymerization process can be carried out in solution, in a more or less concentrated or dilute medium. The polymerization solvent is preferably an inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene.

The monomers which can be used in the context of the invention are described above.

In order to refine the microstructure of the diene elastomers, a modifying and/or randomizing agent may or may not be added in appropriate amounts. This is within the general knowledge of a person skilled in the art.

These alternative forms concerning the polymerization stage can be combined with the preferential or alternative aspects and alternative forms described below.

The polymerization of at least one conjugated diene monomer according to the invention generates elastomer chains having a reactive site at the chain end. These living chains, or living elastomers, subsequently react with the functional polyether during the modification stage. The functional polyether comprises groups reactive with respect to the reactive site of the elastomer, in this case alkoxy groups or halogen atoms substituting the silicon atoms.

The amount of functional polyether intended to react with the living diene elastomer depends essentially on the type of modified diene elastomer desired. Thus, according to certain alternative forms of the modification stage, the molar ratio of the functional polyether to the metal of the polymerization initiator is at least 0.1, preferably at least 0.15, more preferentially at least 0.25, and at most 0.45, preferentially at most 0.40, indeed even at most 0.35. Thus, according to a particularly advantageous alternative form of the modification stage, the molar ratio of the functional polyether to the metal of the polymerization initiator has a value ranging from 0.25 to 0.40.

The conditions for addition of the functional polyether to and for reaction of the functional polyether with the elastomer are conventional as regards modification in anionic polymerization and are known to a person skilled in the art. These conditions do not comprise specific limitations.

For example, this reaction with the living diene elastomer can take place at a temperature of between −20° C. and 100° C., by addition of the functional polyether to the living elastomer chains, or vice versa. This reaction can of course be carried out with one or more different functional polyethers.

The mixing of the living elastomer with the functional polyether can be carried out by any appropriate means, in particular using any mixer having available stirring of static type and/or any dynamic mixer of perfectly stirred type known to a person skilled in the art. The latter determines the reaction time between the living diene polymer and the functional polyether, which can vary from a few minutes, for example 2 minutes, to several hours, for example 2 hours.

The functional polyether can be linear or branched. According to an alternative form of the invention, the functional polyether is a polymer comprising —(O—R)— units, in which R is a linear or branched divalent hydrocarbon group, preferably aliphatic group, having 1 to 10 carbon atoms, in particular a —CH(R')—CH(R")— group, in which R' and R" are, independently of each other, a hydrogen atom or a $C_1$-$C_4$ alkyl substituent; preferably, R is a $C_1$-$C_4$ alkanediyl group, more preferentially a 1,2-ethanediyl or a 1,2- or 1,3-propanediyl group. Mention may thus be made of polyoxymethylene, poly(ethylene oxide), poly(propylene oxide) or polytetrahydrofuran; preferably, the functional polyether results from a poly(ethylene oxide) or poly(propylene oxide).

The functional polyether according to the invention comprises, at each of the two ends of the main chain, a trialkoxysilyl or trihalosilyl group.

When the groups at the end of chains are trialkoxysilyls, the alkoxy groups are $C_1$-$C_{18}$ acyclic or $C_5$-$C_{18}$ cyclic, or also $C_6$-$C_{18}$ aryloxy, groups, preferably $C_1$-$C_8$, preferentially $C_1$-$C_4$, acyclic alkoxy substituents, preferably again methoxy or ethoxy.

When the groups at the end of chains are trihalosilyls, the halogen atom is preferably chlorine.

Advantageously, the functional polyether exhibits a number-average molecular weight from 150 to 5000 g/mol, preferably from 150 to 3000 g/mol and more preferentially from 200 to 3000 g/mol. The number-average molecular weight is calculated by the SEC (Size Exclusion Chromatography) technique described below.

According to an alternative form of the invention, the functional polyether can be represented by the following formula III:

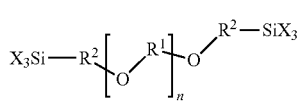

Formula III in which:
- $R^1$ represents a linear or branched divalent $C_1$-$C_{10}$ hydrocarbon group, preferably aliphatic group, in particular a —CH(R')—CH(R")— group, in which R' and R" are, independently of each other, a hydrogen atom or a $C_1$-$C_4$ alkyl substituent; preferably, $R^1$ is a linear $C_1$-$C_4$ alkanediyl group, more preferentially a 1,2- or 1,3-ethanediyl or -propanediyl group,
- the $R^2$ groups represent, independently of each other, a saturated or unsaturated, linear or branched or cyclic, divalent hydrocarbon group, preferably aliphatic group, having 1 to 50 carbon atoms, preferably a linear aliphatic group, which is preferably saturated, preferentially having 1 to 15 carbon atoms, preferably 2 to 10, preferably 3 to 8,
- the X groups represent, identically or differently, a halogen atom, preferably Cl, or a group of formula —$OR^3$ in which the $R^3$ groups represent, independently of one another, a $C_1$-$C_{18}$ alkyl, $C_5$-$C_{18}$ cycloalkoxyl or $C_6$-$C_{18}$ aryl substituent; preferably, the $R^3$ groups represent a $C_1$-$C_8$, preferentially $C_1$-$C_4$, alkyl substituent, preferably again methyl or ethyl,
- n is a number greater than 1, so that the polyether block has a number-average molecular weight substantially from 150 to 5000 g/mol, preferably from 150 to 3000 g/mol and more preferentially from 200 to 3000 g/mol.

Mention may be made, among the functional polyethers corresponding to the formula III, for example, of poly(oxy-1,2-ethanediyl)-α-[3-(triethoxysilyl)propyl]-ω-[3-(triethoxysilyl)propoxy], poly(oxy-1,2-ethanediyl)-α-[3-(trimethoxysilyl)propyl]-ω-[3-(trimethoxysilyl)propoxy], poly[oxy(methyl-1,2-ethanediyl)]-α-[3-(trichlorosilyl)propyl]-ω-[3-(trichlorosilyl)propoxy].

The functional polyether can either be found commercially or be prepared according to methods described in the literature consisting, for example, in carrying out a first allylation reaction on a polyethylene glycol in the presence of allyl bromide and of a base, such as potassium hydroxide, either in aqueous solution or in a two-phase medium or also in an organic solvent, such as tetrahydrofuran, followed by a hydrosilylation reaction, for example by using a platinum catalyst, such as the platinum(0)-1,3-divinyl-1,1,3,3-tetramethyldisiloxane complex or hexachloroplatinic acid, in the presence of a trihalosilane, such as in particular trichlorosilane, or also a trialkoxysilane, such as in particular trimethoxysilane or triethoxysilane, in the presence or in the absence of solvent.

When the silicon atoms of the functional polyether bear halogenated reactive sites, the process for the synthesis of the modified diene copolymer according to the invention generally continues with a hydrolysis or alcoholysis stage known per se making it possible to generate silanol Si—OH or alkoxysilane Si—OR functions from these halogenated active sites which have not reacted with the living elastomer. This hydrolysis or alcoholysis stage can be carried out by adding the polymer solution to an aqueous solution or to a solution containing an alcohol or, conversely, by adding water or the alcohol to the polymer solution. This stage may or may not be carried out in the presence of a base or of a buffer. By way of example, an amine, such as triethylamine, can be used.

When the silicon atoms of the functional polyether bear alkoxysilyl reactive sites, the process for the synthesis of the modified diene copolymer according to the invention can comprise a stage of hydrolysis of the hydrolysable alkoxysilyl functions which have not reacted with the living elastomer, by addition of an acidic, basic or neutral compound as described in the document EP 2 266 819 A1. The hydrolysable alkoxysilyl functions are then converted into silanol functions.

The process for the synthesis of the modified diene copolymer can be continued in a way known per se by the stages of recovery of the copolymer.

These stages can comprise a stripping stage for the purpose of recovering the modified diene copolymer resulting from the previous stages in the dry form. This stripping stage can have the effect of hydrolysing all or part of the residual hydrolysable alkoxysilyl functions of the block copolymer in order to convert them into silanol functions. Advantageously, at least 50 to 70 mol % of the residual hydrolysable alkoxysilyl functions can thus be hydrolysed.

In accordance with the invention, the rubber composition comprises an elastomer matrix comprising at least 75 phr of modified diene elastomer as described above, preferably at least 80 phr, and more preferentially still 100 phr of modified diene elastomer. The modified diene elastomer can consist of a mixture of several modified diene elastomers as described above.

According to an alternative form of the invention, the elastomer matrix can also comprise less than 25 phr, preferably less than 20 phr, of at least one diene elastomer other than the modified diene elastomer described above. Mention may be made, as complementary diene elastomer, of any diene elastomer, whether natural or synthetic. In particular, the diene elastomer can be selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs).

In accordance with the invention, the rubber composition also comprises at least 80 phr of silica, preferentially at least 100 phr, and preferably at most 200 phr, more preferentially at most 150 phr, the optimum content being in a known way different according to the specific applications targeted.

The silica used can be any reinforcing silica known to a person skilled in the art, in particular any precipitated or fumed silica exhibiting a BET specific surface and also a CTAB specific surface both of less than 450 m$^2$/g, preferably from 30 to 400 m$^2$/g, in particular between 60 and 300 m$^2$/g, more preferentially still between 130 and 300 m$^2$/g, indeed even between 130 and 250 m$^2$/g.

In addition to silica, it is possible to use any other type of reinforcing filler known for its capabilities in reinforcing a rubber composition which can be used in the manufacture of tire treads, for example carbon black or another reinforcing inorganic filler, or also a mixture of these fillers.

All carbon blacks, used individually or in the form of mixtures, are suitable as carbon blacks, in particular the blacks of the HAF, ISAF or SAF type conventionally used in the treads of tires ("tyre-grade" blacks). Mention will more particularly be made, among the latter, of the reinforcing carbon blacks of the 100, 200 or 300 series (ASTM grades), such as, for example, the N115, N134, N234, N326, N330, N339, N347 or N375 blacks.

"Reinforcing inorganic filler" should be understood, in the present patent application, by definition, as meaning any inorganic or mineral filler, whatever its colour and its origin (natural or synthetic), capable of reinforcing by itself alone, without means other than an intermediate coupling agent, a rubber composition intended for the manufacture of tires; such a filler is generally characterized, in a known way, by the presence of hydroxyl (—OH) groups at its surface.

Mineral fillers of the siliceous type, apart from silica (SiO$_2$), or of the aluminous type, or also reinforcing titanium oxides, for example described in U.S. Pat. Nos. 6,610,261 and 6,747,087, are suitable in particular as reinforcing inorganic fillers. Mention may in particular be made, among the mineral fillers of the aluminous type, of alumina (Al$_2$O$_3$) or aluminium (oxide) hydroxides.

Also suitable as reinforcing fillers are reinforcing fillers of another nature, in particular carbon black, provided that these reinforcing fillers are covered with a siliceous layer or else comprise, at their surface, functional sites, in particular hydroxyl sites, requiring the use of a coupling agent in order to establish the connection between the filler and the elastomer.

Mention may be made, by way of example, for example, of carbon blacks for tires, such as described, for example, in the patent documents WO 96/37547 and WO 99/28380.

The physical state in which the reinforcing inorganic filler, including the silica, is provided is not important, whether it is in the form of a powder, of microbeads, of granules, of beads or any other appropriate densified form. Of course, reinforcing filler is also understood to mean mixtures of different reinforcing fillers, in particular of highly dispersible siliceous fillers as described above.

According to an advantageous alternative form of the invention, the reinforcing filler is predominantly silica; preferably, it comprises more than 50% by weight, of the total weight of the reinforcing filler, of silica.

According to this alternative form, when carbon black is also present, it can be used at a content of less than 20 phr, more preferentially of less than 10 phr, and at a content of greater than 0.5 phr, in particular of greater than or equal to 1 phr.

The use of silica as reinforcing filler may require the use of a coupling agent in order to establish the connection between the filler and the elastomer. It is then possible to use, as coupling agents, organosilanes, in particular alkoxysilane polysulfides or mercaptosilanes, or also at least bifunctional polyorganosiloxanes.

When the composition according to the invention comprises a coupling agent, its amount depends on that of the reinforcing inorganic filler. Its content is easily adjusted by a person skilled in the art according to the content of this filler; it is typically of the order of 0.5% to 15% by weight, with respect to the amount of reinforcing inorganic filler other than carbon black, preferentially from 6% to 12% by weight.

The rubber composition according to the invention can also comprise, in addition to the coupling agents, coupling activators, agents for covering the fillers or more generally processing aids capable, in a known way, by virtue of an improvement in the dispersion of the filler in the elastomer matrix and of a lowering of the viscosity of the composition, of improving its ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

The rubber compositions in accordance with the invention can also comprise reinforcing organic fillers which can replace all or part of the carbon blacks or of the other reinforcing inorganic fillers described above. Mention may be made, as examples of reinforcing organic fillers, of functionalized polyvinyl organic fillers, such as described in Applications WO-A-2006/069792, WO-A-2006/069793, WO-A-2008/003434 and WO-A-2008/003435.

The rubber composition according to the invention can also contain at least one plasticizer. In a way known to a person skilled in the art of tire rubber compositions, this plasticizer is preferably chosen from hydrocarbon resins with a high glass transition temperature (Tg), hydrocarbon resins with a low Tg, plasticizing oils and their mixtures. Preferably, the plasticizer is chosen from hydrocarbon resins with a high Tg, plasticizing oils and their mixtures.

According to an advantageous alternative form of the invention, the total content of plasticizer in the composition is greater than or equal to 20 phr, more preferentially greater than or equal to 50 phr, and advantageously at most 100 phr.

By definition, a hydrocarbon resin with a high Tg is a solid at ambient temperature and pressure (20° C., 1 atm), while a plasticizing oil is liquid at ambient temperature and a hydrocarbon resin with a low Tg is viscous at ambient temperature. The Tg is measured according to Standard ASTM D3418 (1999).

In a known way, the hydrocarbon resins with a high Tg are thermoplastic hydrocarbon resins, the Tg of which is greater than 20° C. The preferred hydrocarbon resins with a high Tg which can be used in the context of the invention are well known to a person skilled in the art and are commercially available. The plasticizer can also contain a plasticizing oil (or extender oil) which is liquid at 20° C., said to be "low Tg", that is to say which by definition exhibits a Tg of less than 20° C., preferably of less than 40° C.

Any extender oil, whether it is of aromatic or non-aromatic nature, known for its plasticizing properties with regard to elastomers can be used. At ambient temperature (20° C.), these oils, which are more or less viscous, are liquids (that is to say, as a reminder, substances which have the ability to eventually assume the shape of their container), unlike in particular hydrocarbon resins with a high Tg, which are by nature solids at ambient temperature.

Plasticizing oils selected from the group consisting of naphthenic oils (low- or high-viscosity, in particular hydrogenated or non-hydrogenated), paraffinic oils, MES (Medium Extracted Solvate) oils, TDAE (Treated Distillate Aromatic Extract) oils, RAE (Residual Aromatic Extract) oils, TRAE (Treated Residual Aromatic Extract) oils and SRAE (Safety Residual Aromatic Extract) oils, mineral oils, vegetable oils, ether plasticizers, ester plasticizers, phosphate plasticizers, sulfonate plasticizers and the mixtures of these compounds are particularly suitable.

The rubber composition in accordance with the invention can also comprise all or part of the usual additives and processing aids known to a person skilled in the art and generally used in rubber compositions for tires, in particular rubber compositions of treads, such as, for example, non-reinforcing fillers, pigments, protective agents, such as antiozone waxes, chemical antiozonants or antioxidants, anti-fatigue agents, reinforcing resins (such as described, for example, in Application WO 02/10269), a crosslinking system, for example based on sulfur and other vulcanization agents, and/or on peroxide and/or on bismaleimide.

The rubber composition in accordance with the invention is manufactured in appropriate mixers using two successive preparation phases well known to a person skilled in the art:
  a first phase of thermomechanical working or kneading ("non-productive" phase), which can be carried out in a single thermomechanical stage during which all the necessary constituents, in particular the elastomer matrix, the fillers and the optional other various additives, with the exception of the crosslinking system, are introduced into an appropriate mixer, such as a standard internal mixer (for example of 'Banbury' type). The incorporation of the filler in the elastomer can be carried out in one or more goes by thermomechanically kneading. The non-productive phase is carried out at high temperature, up to a maximum temperature of between 110° C. and 200° C., preferably between 130° C. and 185° C., for a period of time generally of between 2 and 10 minutes.
  a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The crosslinking system is then incorporated and the combined mixture is then mixed for a few minutes, for example between 5 and 15 min.

The final composition thus obtained is subsequently calendered, for example in the form of a sheet or of a plaque, in particular for a laboratory characterization, or also extruded in the form of a rubber semi-finished product (or profiled element) which can be used, for example, as a vehicle tire tread.

The composition can be either in the raw state (before crosslinking or vulcanization) or in the cured state (after crosslinking or vulcanization), can be a semi-finished product which can be used in a tire.

The crosslinking of the composition can be carried out in a way known to a person skilled in the art, for example at a temperature of between 130° C. and 200° C., under pressure.

Due to the maintenance of the hysteresis/raw processing properties compromise despite a high content of filler which characterizes a reinforced rubber composition according to the invention, it should be noted that such a composition can constitute any semi-finished product of the tire and very particularly the tread, reducing in particular its rolling resistance, while improving its performance qualities related to the high content of reinforcing filler.

A final subject-matter of the invention is thus a tire comprising a semi-finished article constituted, in all or in part, by a composition according to the invention, in particular a tread.

A better understanding of the abovementioned characteristics of the present invention, and also of others, will be obtained on reading the following description of several implementational examples of the invention, given by way of illustration and without limitation.

EXAMPLES

I—Measurements and Tests Used

Determination of the Value of the Mn of the Branch Before Coupling or Star-Branching by Size Exclusion Chromatography The SEC (Size Exclusion Chromatography) technique makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) can be determined from commercial standards and the polydispersity index (PI=Mw/Mn) can be calculated via a "Moore" calibration.

There is no specific treatment of the polymer sample before analysis. The latter is simply dissolved in the elution solvent at a concentration of approximately 1 $g \cdot l^{-1}$. The solution is then filtered through a filter with a porosity of 0.45 µm before injection.

The apparatus used is a Waters Alliance chromatographic line. The elution solvent is tetrahydrofuran, the flow rate is 1 $ml \cdot min^{-1}$, the temperature of the system is 35° C. and the analytical time is 30 min. A set of two Waters columns with the Styragel HT6E trade name is used. The volume of the solution of the polymer sample injected is 100 µl. The detector is a Waters 2410 differential refractometer and the software for making use of the chromatographic data is the Waters Empower system.

The calculated average molar masses are relative to a calibration curve produced for SBRs having the following microstructure: 25% by weight of units of styrene type, 23% by weight of units of 1,2-type and 50% by weight of units of trans-1,4-type.

Determination of the Contents of Linear Macromolecules and Branched Macromolecules by the High-Resolution Size Exclusion Chromatography (High-Resolution SEC) Technique The high-resolution SEC technique is used to determine the percentages by weight of the various populations of chains present in a polymer sample.

There is no specific treatment of the polymer sample before analysis. The latter is simply dissolved in the elution solvent at a concentration of approximately 1 g·l$^{-1}$. The solution is then filtered through a filter with a porosity of 0.45 µm before injection.

The apparatus used is a Waters Alliance 2695 chromatographic line. The elution solvent is tetrahydrofuran, the flow rate is 0.2 ml·min$^{-1}$ and the temperature of the system is 35° C. A set of three identical columns in series is used (Shodex, length 300 mm, diameter 8 mm). The number of theoretical plates of the set of columns is greater than 22 000. The volume of the solution of the polymer sample injected is 50 µl. The detector is a Waters 2414 differential refractometer and the software for making use of the chromatographic data is the Waters Empower system.

The calculated molar masses are relative to a calibration curve produced for SBRs having the following microstructure: 25% by weight of units of styrene type, 23% by weight of units of 1,2-type and 50% by weight of units of trans-1,4-type.

Determination of the Mooney viscosity

For the polymers and the rubber compositions, the Mooney viscosities ML(1+4)100° C. are measured according to Standard ASTM D-1646.

An oscillating consistometer is used as described in Standard ASTM D-1646. The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement after rotating for 4 minutes is measured. The Mooney plasticity ML(1+4) is expressed in "Mooney unit" (MU, with 1 MU=0.83 N·m).

Determination of the Glass Transition Temperature of the Polymers

The glass transition temperatures (Tg) of the elastomers are determined using a differential scanning calorimeter according to Standard ASTM D3418.

Dynamic Properties

The dynamic properties and in particular tan δ max are measured on a viscosity analyser (Metravib VA4000) according to Standard ASTM D 5992-96. The response of a sample of vulcanized composition (cylindrical test specimen with a thickness of 2 mm and a cross section of 79 mm$^2$), subjected to a simple alternating sinusoidal shear stress, at a frequency of 10 Hz, under standard temperature conditions (23° C.) according to Standard ASTM D 1349-99, is recorded. A strain amplitude sweep is carried out from 0.1% to 50% peak-to-peak (outward cycle) and then from 50% to 0.1% peak-to-peak (return cycle). The result more particularly made use of is the loss factor tan δ. For the return cycle, the maximum value of tan δ observed, denoted tan δ max, is indicated. This value is representative of the hysteresis of the material and in the present case of the rolling resistance: the smaller the value of tan δ max, the lower the rolling resistance.

II—Examples of Preparation of the Elastomers

Preparation of the Polymer A: Diene Block Copolymer—Control 1.74 kg of styrene and 5.84 kg of butadiene, and also 1.07 l of a 0.36 mol·l$^{-1}$ solution of tetrahydrofuran in methylcyclohexane, are injected into a 90-litre reactor, maintained under a nitrogen pressure of approximately 2 bar, containing 44 kg of methylcyclohexane. After neutralization of the impurities in the solution to be polymerized by addition of n-butyllithium, 716 ml of 0.06 mol·l$^{-1}$ n-butyllithium in methylcyclohexane are added. The polymerization is carried out at 50° C.

After 45 minutes, the degree of conversion of the monomers reaches 68%. This degree is determined by weighing an extract dried at 140° C. under a reduced pressure of 200 mmHg. The value of the branch Mn before coupling, determined by SEC RI, is 120 000 g·mol$^{-1}$. 1.19 l of a 0.018 mol·l$^{-1}$ solution of poly(oxy-1,2-ethanediyl)-α-[3-(triethoxysilyl)propyl]-ω-[3-(triethoxysilyl)propoxy] (CAS 666829-33-0) in toluene are then added (n-poly(oxy-1,2-ethanediyl)-α-[3-(triethoxysilyl)propyl]-ω-[3-(triethoxysilyl)propoxy]/n-(n-butyllithium)=0.5). The solution is stirred at a temperature of 50° C. for 30 minutes. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The Mooney viscosity of the polymer is 70.

The distribution of the 1 branch, 2 branch, 3 branch, 4 branch, 5 branch and 6 branch entities (1b/2b/3b/4b/5b/6b), determined by high-resolution SEC, is as follows: 16/72/6/4/3/0.

The glass transition temperature of this copolymer is −63° C.

Preparation of the Polymer B: Diene Block Copolymer According to the Invention 1.74 kg of styrene and 5.84 kg of butadiene, and also 1.02 l of a 0.36 mol·l$^{-1}$ solution of tetrahydrofuran in methylcyclohexane, are injected into a 90-litre reactor, maintained under a nitrogen pressure of approximately 2 bar, containing 44 kg of methylcyclohexane. After neutralization of the impurities in the solution to be polymerized by addition of n-butyllithium, 1.1 ml of 0.06 mol·l$^{-1}$ n-butyllithium in methylcyclohexane are added. The polymerization is carried out at 50° C.

After 45 minutes, the degree of conversion of the monomers reaches 70%. This degree is determined by weighing an extract dried at 140° C. under a reduced pressure of 200 mmHg. The value of the branch Mn before coupling, determined by SEC RI, is 81 000 g·mol$^{-1}$. 37 l of a 0.018 mol·l$^{-1}$ solution of poly(oxy-1,2-ethanediyl)-α-[3-(triethoxysilyl)propyl]-ω-[3-(triethoxysilyl)propoxy] (CAS 666829-33-0) in toluene are then added (n-poly(oxy-1,2-ethanediyl)-α-[3-(triethoxysilyl)propyl]-ω-[3-(triethoxysilyl)propoxy]/n-(n-butyllithium)=0.35). The solution is stirred at a temperature of 50° C. for 15 minutes. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The Mooney viscosity of the polymer is 44.

The distribution of the 1 branch, 2 branch, 3 branch, 4 branch, 5 branch and 6 branch entities (1b/2b/3b/4b/5b/6b), determined by high-resolution SEC, is as follows: 12/29/21/38/0/0.

The glass transition temperature of this copolymer is −64° C.

Examples of Preparations of the Rubber Compositions

The elastomers A and B have been used in the preparation of rubber compositions of tread type, each comprising silica as reinforcing filler according to two different formulations.

Each of the following compositions is prepared, in a first step, by thermomechanical working and then, in a second finishing step, by mechanical working, according to standard processes for the preparation of a rubber mixture.

The elastomer, two thirds of the silica, the black, the coupling agent and the oil, then, approximately one minute later, the remainder of the reinforcing filler, the resin, the antioxidant, the stearic acid and the antiozone wax and then, approximately two minutes later, the zinc monoxide are successively introduced into a laboratory internal mixer of 'Banbury' type, the capacity of which is 400 cm$^3$, which is 70% filled and the starting temperature of which is approximately 90° C.

The stage of thermomechanical working is carried out for 4 to 5 minutes, up to a maximum dropping temperature of approximately 160° C.

The abovementioned first step of thermomechanical working is thus carried out, it being specified that the mean speed of the blades during this first step is 50 rpm.

The mixture thus obtained is recovered and cooled and then, in an external mixer (homofinisher), the sulfur and the accelerator are added at 30° C., the combined mixture being further mixed for a period of time of 3 to 4 minutes (abovementioned second step of mechanical working).

The compositions thus obtained are subsequently calendered, either in the form of plaques (with a thickness ranging from 2 to 3 mm) or thin sheets of rubber, for the measurement of their physical or mechanical properties, or in the form of profiled elements which can be used directly, after cutting and/or assembling to the desired dimensions, for example as semi-finished products for tires, in particular for treads.

Crosslinking is carried out at 150° C. for 40 min.

Each of the compositions exhibits the following formulation (expressed in phr: parts per hundred parts of elastomer):

TABLE 1

| Ingredients | Formulation 1 | Formulation 2 |
| --- | --- | --- |
| Polymer | 100 | 100 |
| Silica | 110 | 70 |
| Carbon black | 3 | 3 |
| Oil | 13 | 0 |
| Resin | 59 | 46 |
| Coupling agent | 8.8 | 5.6 |
| Stearic acid | 3 | 3 |
| Zinc oxide | 1.5 | 1.5 |
| DPG | 2.3 | 1.5 |
| Soluble sulfur | 1 | 1 |

TABLE 1-continued

| Ingredients | Formulation 1 | Formulation 2 |
| --- | --- | --- |
| Accelerator | 2.3 | 2.3 |
| Antioxidant | 3 | 3 |

Carbon black: ASTM N234 grade from Cabot Corporation

Oil: Sunflower oil comprising 85% by weight of oleic acid, Lubrirob Tod 1880 from Novance Resin: Aromatic DCPD resin, Escorez 5600 or PR383, from ExxonMobil Coupling agent: Silane TESPT Si69 from Degussa DPG: Diphenylguanidine (Perkacit DPG from Flexsys)

Accelerator: CBS: N-Cyclohexyl-2-benzothiazolesulfenamide (Santocure CBS from Flexsys)

Antioxidant: N-(1,3-Dimethylbutyl)-N'-phenyl-p-phenylenediamine from Flexsys

Results:

The results presented in the table below show:

That the elastomer according to the invention improves the hysteresis/Mooney composition compromise with respect to the reference elastomer, whether in one or the other of the two formulations.

That the elastomer according to the invention improves particularly the compromise when it is used in a composition containing a high content of silica (Formulation 1).

TABLE 2

| | Formulation 1 | | |
| --- | --- | --- | --- |
| Polymer | Tan delta max 23° C. | Mooney of the composition | Performance index |
| A Control | 100 | 100 | 1.0 |
| B Invention | 102 | 65 | 1.5 |

TABLE 3

| | Formulation 2 | | |
| --- | --- | --- | --- |
| Polymer | Tan delta max 23° C. | Mooney of the composition | Performance index |
| A Control | 100 | 100 | 1.0 |
| B Invention | 112 | 64 | 1.4 |

In the table above, the tan delta or Mooney values are expressed in base 100 with respect to the control.

The performance index is calculated as: 10 000/(value of tan delta*value of Mooney composition). The lower the tan delta, the lower the Mooney composition, the better the rolling resistance/processing performance compromise.

The invention claimed is:

1. A rubber composition based at least on a reinforcing filler comprising silica and on an elastomer matrix comprising a modified diene elastomer, wherein:
the content of silica is greater than or equal to 80 phr,
the content of modified diene elastomer is greater than or equal to 75 phr, and
the modified diene elastomer being a copolymer which comprises macromolecules, the macromolecules comprising, within their structure, a linear or branched polyether block comprising, at each of the two ends of the block, a branch point to which up to three diene elastomer branches and up to three —OR groups are bonded, R representing, independently of one another, a $C_1$-$C_8$ alkyl substituent or a hydrogen atom, the copolymer exhibiting a Mooney viscosity of at least 30 and at most 100, the copolymer being composed:
of at least 20% by weight, based on the total weight of the copolymer, of branched macromolecules comprising a polyether block to which at least three diene elastomer blocks are bonded,
of at most 80% by weight, based on the total weight of the copolymer, of linear macromolecules, the polyether block exhibiting a number-average molecular weight varying from 150 to 5000 g/mol, and each of the branch points consisting of a silicon atom, wherein the branched macromolecules correspond to formula I:

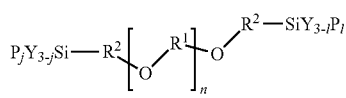

Formula I in which:
$R^1$ represents a linear or branched divalent $C_1$-$C_{10}$ hydrocarbon group, in particular a —CH(R')—CH(R")— group, in which R' and R" are, independently of each other, a hydrogen atom or a $C_1$-$C_4$ alkyl substituent;
the $R^2$ groups represent, independently of each other, a saturated or unsaturated, linear or branched or cyclic, divalent hydrocarbon group, having 1 to 50 carbon atoms,
the Y groups represent, identically or differently, a halogen atom or a group of formula —$OR^4$ in which the $R^4$ groups represent, independently of one another, a hydrogen atom or a $C_1$-$C_8$ alkyl substituent;
i and j are numbers having, each independently of the other, the value 1, 2 or 3, with the proviso that (i+j) varies from 3 to 6, and
P represents a diene elastomer block;

and the linear block macromolecules correspond to formula II:

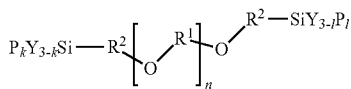

Formula II in which:
$R^1$ represents a linear or branched divalent $C_1$-$C_{10}$ hydrocarbon group, in particular a —CH(R')—CH(R")— group, in which R' and R" are, independently of each other, a hydrogen atom or a $C_1$-$C_4$ alkyl substituent;
the $R^2$ groups represent, independently of each other, a saturated or unsaturated, linear or branched or cyclic, divalent hydrocarbon group, having 1 to 50 carbon atoms,
the Y groups represent, identically or differently, a halogen atom or a group of formula —$OR^4$ in which the $R^4$ groups represent, independently of one another, a hydrogen atom or a $C_1$-$C_8$ alkyl substituent;

k and l are numbers having, each independently of the other, the value 0 or 1, with the proviso that (k+1) has the value 1 or 2, and
P represents a diene elastomer block.

2. The rubber composition according to claim 1, wherein the modified diene elastomer is a polybutadiene or a butadiene copolymer.

3. The rubber composition according to claim 1, wherein the elastomer branches of the modified diene elastomer have a number-average molar mass (Mn) of at least 40 000 g/mol and of at most 100 000 g/mol.

4. The rubber composition according to claim 1, wherein the end of the elastomer branches not bonded to a silicon atom bears a function comprising a nitrogen atom.

5. The rubber composition according to claim 1, wherein the polyether block is a polyoxymethylene, poly(ethylene oxide), poly(propylene oxide) or polytetrahydrofuran block.

6. The rubber composition according to claim 1, wherein the copolymer comprises at least 50% by weight, based on the total weight of the copolymer, of branched macromolecules consisting of a polyether block to which at least three diene elastomer blocks are bonded.

7. The rubber composition according to claim 1, wherein the copolymer comprises at least 20% by weight, based on the total weight of the copolymer, of branched macromolecules consisting of a polyether block to which three diene elastomer blocks are bonded.

8. The rubber composition according to claim 1, wherein the copolymer comprises at most 25% by weight, based on the total weight of the copolymer, of branched macromolecules consisting of a polyether block to which four or more diene elastomer blocks are bonded.

9. The rubber composition according to claim 1, wherein at least one of the following characteristics is/are observed:
the polyether block is linear consisting of —(OR)— units, in which R is a $C_1$-$C_4$ alkanediyl group;
the polyether block exhibits a number-average molecular weight substantially of 150 to 5000 g/mol;
all or a part of the alkoxy functions substituting one or more silicon atoms are hydrolysed to give hydroxyl groups;
the diene elastomer is a butadiene/styrene copolymer;
all or a part of the ends of elastomer branches not bonded to a silicon atom are functionalized, with respect to the number of moles of chain end, by an amine function;
the mean Mn of the elastomer branches is less than 150 000 g/mol;
the modified diene elastomer comprises at least 50% by weight, based on the total weight of the modified diene elastomer, of branched macromolecules having at least three branches; and
the modified diene elastomer comprises at least 20% by weight, based on the total weight of the modified diene elastomer, of branched macromolecules having three branches.

10. The rubber composition according to claim 1, wherein the content of silica is greater than or equal to 100 phr.

11. The rubber composition according to claim 1, wherein the composition comprises 20 phr or more of at least one plasticizer.

12. The rubber composition according to claim 11, wherein the plasticizer is chosen from hydrocarbon resins with a high Tg, plasticizing oils and their mixtures.

13. The rubber composition according to claim 1, wherein the copolymer exhibits a Mooney viscosity of at least 40 and at most 100.

14. The rubber composition according to claim 1, wherein the copolymer is composed of at least 30% by weight, based on the total weight of the copolymer, of the branched macromolecules comprising a polyether block to which at least three diene elastomer blocks are bonded.

15. The rubber composition according to claim 1, wherein the copolymer is composed of at most 70% by weight, based on the total weight of the copolymer, of linear macromolecules.

16. The rubber composition according to claim 2, wherein the modified diene elastomer is a butadiene/styrene copolymer.

17. The rubber composition according to claim 4, wherein the function comprising a nitrogen atom is a cyclic or acyclic amine function.

18. The rubber composition according to claim 5, wherein the polyether block is a poly(ethylene oxide) or poly(propylene oxide) block.

19. A tire comprising a semi-finished article constituted, in all or in part, by a composition according to claim 1.

* * * * *